(12) United States Patent
le Grand et al.

(10) Patent No.: US 10,367,601 B2
(45) Date of Patent: Jul. 30, 2019

(54) METHOD AND DEVICE FOR PROVIDING PIPELINE REORDERING OF ENCODER PARAMETER CONTROLLERS FOR AN ENCODER

(71) Applicant: Google LLC, Mountain View, CA (US)

(72) Inventors: Tina le Grand, Jarfalla (SE); Niklas Blum, Mountain View, CA (US); Minyue Li, Solna (SE); Henrik Lundin, Sollentuna (SE); Michael Tschumi, Bern (CH); Alexander Narest, Bern (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/236,025

(22) Filed: Aug. 12, 2016

(65) Prior Publication Data

US 2018/0048420 A1  Feb. 15, 2018

(51) Int. Cl.
*H03M 13/00* (2006.01)
*H04L 1/00* (2006.01)

(52) U.S. Cl.
CPC .......... *H04L 1/0007* (2013.01); *H04L 1/0009* (2013.01); *H04L 1/0014* (2013.01); *H04L 1/0015* (2013.01); *H04L 1/0033* (2013.01)

(58) Field of Classification Search
CPC ............................ H04L 1/0042; H04W 24/08
See application file for complete search history.

(56) References Cited

U.S. PATENT DOCUMENTS

| | | | |
|---|---|---|---|
| 2006/0015799 A1* | 1/2006 | Sung ...................... | H04N 19/61 714/795 |
| 2010/0098176 A1* | 4/2010 | Liu ...................... | H04L 12/1868 375/259 |
| 2016/0227551 A1* | 8/2016 | Freeman ........... | H04W 28/0289 |

* cited by examiner

*Primary Examiner* — Samir W Rizk
(74) *Attorney, Agent, or Firm* — Honigman LLP

(57) ABSTRACT

Control logic determines when a network condition has changed by evaluating network condition data. Based on a detected network condition change, the control logic reorders an encoder parameter controller execution sequence of a plurality of encoder parameter controllers. The control logic configures the plurality of reordered encoder parameter controllers so that an encoder parameter determination from a prior encoder parameter controller is used as a decision input for a subsequent encoder parameter controller. An encoder encodes data, such as audio data, video data or other type of data using the generated encoder control parameters from the reordered plurality of encoder parameter controllers. A related method is also disclosed.

20 Claims, 5 Drawing Sheets

METHOD AND DEVICE FOR PROVIDING PIPELINE REORDERING OF ENCODER PARAMETER CONTROLLERS FOR AN ENCODER

BACKGROUND OF THE DISCLOSURE

Communication devices, such as smartphones, tablets, laptops, desktops, wearables, TVs, set-top boxes, and other communication devices employ one or more video andor audio calling applications to allow users of the communication devices to carry out a videoaudio call either in a one-to-one manner, one-to-many manner, or many-to-many manner. Communication networks used with such applications include wireless wide area networks (e.g., cellular networks), IP networks (e.g., the internet), wireless local area networks (e.g., wi-fi networks), and wired networks. A calling user experience over IP networks and other networks, are being challenged by varying network conditions. The video andor audio applications need to be able to adapt to changing networking conditions on the fly.

Audio network adaptation (ANA) techniques attempt to update one audio codec control parameter, for example, a codec bit rate in real time according to network condition changes. For example, the video andor audio calling application receives network condition data, such as bandwidth estimation (BWE), packet loss rate information, and round trip time information, either by testing the network or receiving the network condition information from the network, and outputs changes in the codec control parameter, for example to vary the bit rate during a voice call. In a typical video andor audio calling application, other audio encoding modes, e.g., the discontinuous transmission (DTX) mode, stays the same during a call. Techniques for controlling multiple modes of the encoder or audio codec to make optimal adaptation to real-time network condition are desired. If encoder control is incorrect, jerky motion for video calls can occur, improper audio synchronization with video can occur, as well as loss of conversation information.

BRIEF DESCRIPTION OF THE DRAWINGS

The disclosure will be more readily understood in view of the following description when accompanied by the below figures and wherein like reference numerals represent like elements, wherein.

SUMMARY OF THE DISCLOSURE

Figure 1:
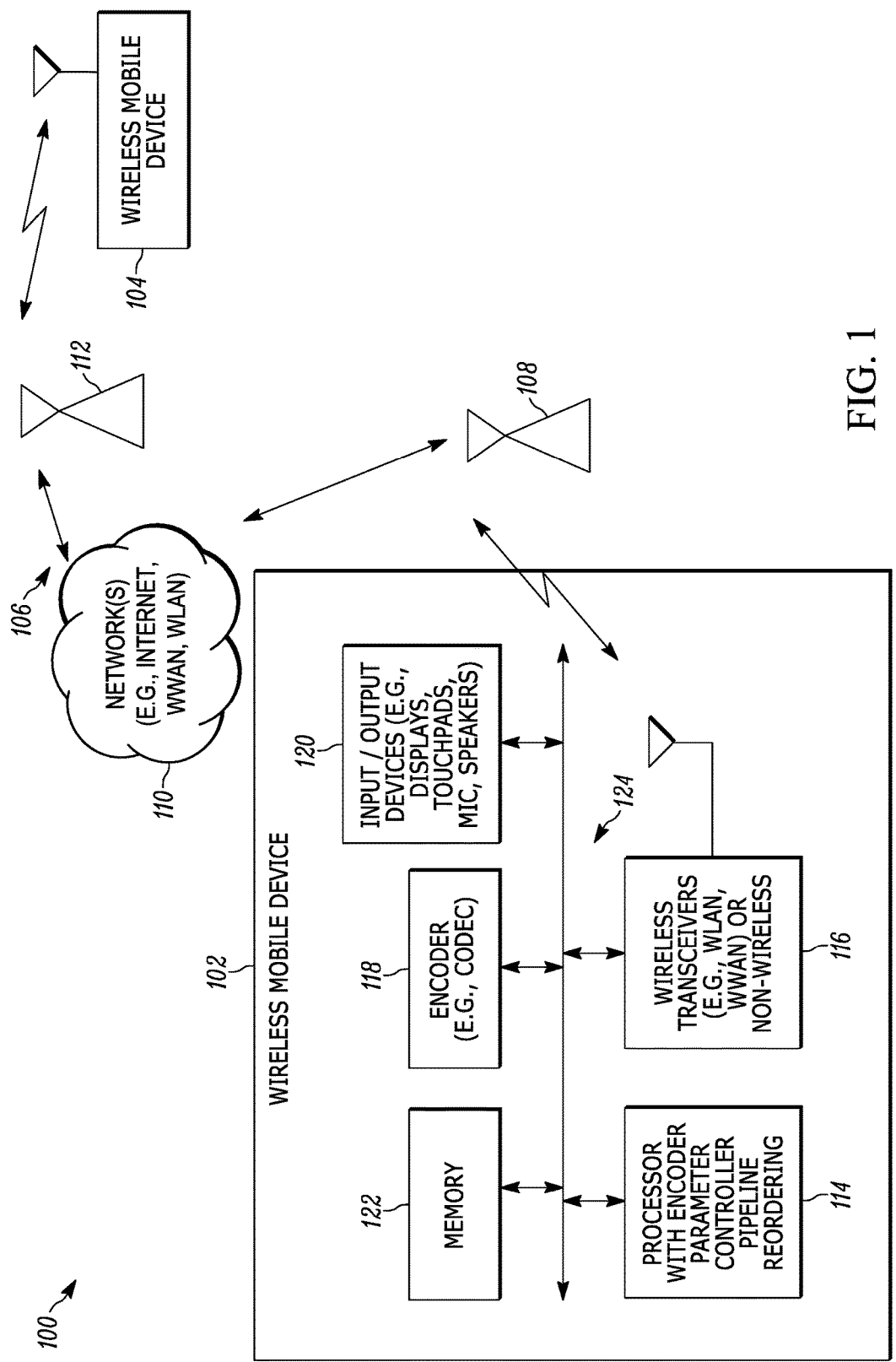
FIG. 1 is a block diagram illustrating a communication system in accordance with one example set forth in the disclosure.

Briefly, in one example, a method and communication device provides pipeline reordering so that decisions are made for generation of codec parameters in a sequential manner by reordering encoder parameter controllers in an encoder parameter controller pipeline depending upon network condition changes. The decisions on encoder parameters former in the pipeline chain are taken into account for decisions on the later encoder parameters.

In one example a communication device incudes an encoder, such as an audio codec, a transmitter, control logic and a plurality of encoder parameter controllers that provide parameters to the encoder to control the encoder. The encoder parameter controllers include for example, one or more combinations of an FEC parameter controller, a frame length parameter controller, a bit rate parameter controller, a DTX parameter controller or other encoder parameter controllers. The control logic determines when a network condition has changed by evaluating network condition data and based on a detected network condition change reorders an encoder parameter controller execution sequence of the plurality of encoder parameter controllers. The control logic configures the plurality of reordered encoder parameter controllers so that an encoder parameter determination from a prior encoder parameter controller is used as a decision input for a subsequent encoder parameter controller. The encoder encodes data, such as audio data, video data or other type of data using the generated encoder control parameters from the reordered plurality of encoder parameter controllers. The transmitter transmits the encoded data to a recipient unit.

In one example, the control logic includes at least one controller comparator that compares the network condition data to stored order priority data corresponding to each of the plurality of encoder parameter controllers. The controller comparator produces controller pipeline order data. The control logic includes a parameter controller sequence determiner that reorders a pipeline of the plurality of encoder parameter controllers, based on the controller pipeline order data, so that a higher priority encoder parameter controller is processed earlier in the pipeline and determines a corresponding encoder parameter which is used by the other encoder parameter controller subsequent in the pipeline.

In one example, the control logic includes at least one controller comparator that stores data representing controller pipeline order regions in a network condition data space corresponding to at least packet loss rate and network bandwidth estimation. The network condition data provides a point within one of the regions. The controller comparator selects an order for an encoder parameter controller depending on where the network condition data point lies within the regions of the network condition space. In one example, the control logic evaluates wireless network condition data that includes at least one of data representing: wireless channel bandwidth use estimation, packet loss level of data in the wireless communication, and round trip time information of data communicated in the wireless communication. The controller comparator stores data representing controller pipeline order regions defined by data representing an empirically determined preferred encoder parameter controller operational boundary between the plurality of encoder parameter controllers.

In one example, the parameter controller sequence determinator logic generates controller pipeline sequence selection data that causes the reordering of the encoder parameter controller execution sequence for the plurality of encoder parameter controllers in response to the controller pipeline order data. In one example, the encoder is an audio codec and the control logic determines when a plurality of wireless network conditions have changed during a voice call such that reordering of the plurality of encoder parameter controllers occurs more than once during the same voice call.

In one example, encoder control parameters that are produced by the reordered plurality of encoder parameter controllers includes generating, by a higher priority forward error correction parameter controller, encoder parameter data representing whether forward error correction should be on or off and an amount of forward error correction for the encoder to apply. A lower priority frame length parameter controller in the pipeline uses the encoder parameter data from the higher priority forward error correction parameter controller in a decision to determine encoder parameter data relating to frame length of data to be provided to the encoder.

In one example, order priority data in the form of points in network condition space is used to determine execution order priority of the encoder parameter controllers. In another example, network condition space is separated into controller pipeline order regions wherein each encoder parameter controller is given a specified priority in each region. Data is stored in memory that represents order priority data for a relevant encoder parameter controller.

The order priority data indicates, for example, a desired operational setting for the encoder parameter controller at given values of network condition data. In another example, data representing a boundary line or curve, which may be determined empirically by testing the network apriori can be used to define regions that are used as opposed to, for example, points. Although any suitable mechanism may be employed. Upon an undesirable change in a network conditions such as undesirable bandwidth estimations, round trip time, or packet loss rates, the pipeline of encoder parameter controllers is reconfigured so that encoder parameters are generated in a different order depending upon the ordering of the respective encoder parameter controllers within the pipeline. Where the control logic is implemented as one or more processors executing code, controller comparator code modules are called to provide their respective parameter controller order data.

The order priority data per controller corresponds to a particular controller optimal point meaning that when the network condition is at the point, the corresponding controller becomes most important (compared to other controllers compared in by a comparator). In one embodiment, the data representing these points is stored and the order of the encoder parameter controllers is determined by the distance between the operating network condition point and the order priority data. If two or more points are the same distance, the parameter controller sequence determinator may use a predefined ordering list, if desired.

DETAILED DESCRIPTION OF DISCLOSED EMBODIMENTS

As noted above, known systems typically adjust one encoder parameter such as bit rate when network conditions change resulting in suboptimal data encoding. In one example disclosed herein a type of programmable encoder parameter provision system takes into account multiple different types of network condition changes and causes multiple encoder parameters to be changed for the encoder thereby providing a finer adjustment of data encoding according to the types of changes in the network condition. In one example, a number of selectable encoder parameter controllers are programmably reordered to change multiple encoder parameters as network conditions change during a call. The encoder encodes the data using the encoder parameters provided by the reordered encoder parameter controllers.

A type of parameter controller pipeline reordering is employed so that decisions are made for generation of codec parameters in a sequential manner by reordering the encoder parameter controller pipeline depending upon network condition changes. The decisions on encoder parameters former in the pipeline chain are taken into account for decisions on the later encoder parameters. In one example, the order of the encoder parameter controller in the pipeline depends on relative importance of the respective encoder parameter controller in handling the network condition. For example, an FEC parameter controller is more important than a frame length parameter controller at a high packet loss rate. Therefore the FEC parameter controller is programmed to execute before a frame length parameter controller and the later frame length parameter controller uses the encoder parameter (e.g., data representing FEC onoff and an amount of FEC to apply) provided by the FEC parameter controller in its decision on frame length. Encoder parameters from each of the encoder parameter controllers are used by the encoder to encode data.

FIG. 1 illustrates an example of a communication system 100 wherein a communication device 102 communicates with a recipient communication device 104 through a communication network generally designated 106. In this example, a wireless communication system is illustrated, however it will be recognized that a wired communication device and network may be employed. In this example, communication device 102 is a wireless mobile device such as, but not limited to, a smartphone, laptop, wearable, tablet or any other suitable wireless mobile device that communicates through a wireless wide area network such as a cellular network through base station 108 which may be linked to one or more networks including the internet 110. In this example, communication device 104 is in wireless communication with base station 112 which is also in communication with network 110 so that a video conference call or audio call can be carried out.

In this example, the communication device 102 includes one or more processors 114, one or more wireless transceivers 116, one or more encoders 118, one or more inputoutput devices 120, and memory 122 that are operatively in communication through various communication paths generally shown as 124 as known in the art. The memory 122 represents different memory hierarchies including cache memory, DRAM, ROM, or any other suitable non-transitory memory. In one example, the memory 122 stores executable instructions, that when executed by the one or more processors 114 cause the one or more processors 114, such as a CPU, APU or other processor to operate as various control logic and encoder parameter controllers described herein. It will be recognized that the operations described herein may also be implemented in other forms including one or more state machines, field programmable gate arrays, digital signal processors, discrete logic and other suitable structures.

The one or more wireless transceivers 116 may include wireless local area network transceivers such as a Wi-Fi transceiver, one or more wireless wide area network (WWAN) transceivers, for example to communication via cellular communications including, but not limited to, cellular systems, LTE cellular systems or any other suitable wireless transceivers. During a video call or audio call audio data is encoded by encoder 118 prior to being transmitted to the recipient communication device 104. In one example, encoder 118 may be implemented as a codec which also decodes received audio and or video from the communication device 104. The one or more processors 114 in this example, include encoder parameter controller pipeline reordering capability as further described below.

Figure 2:
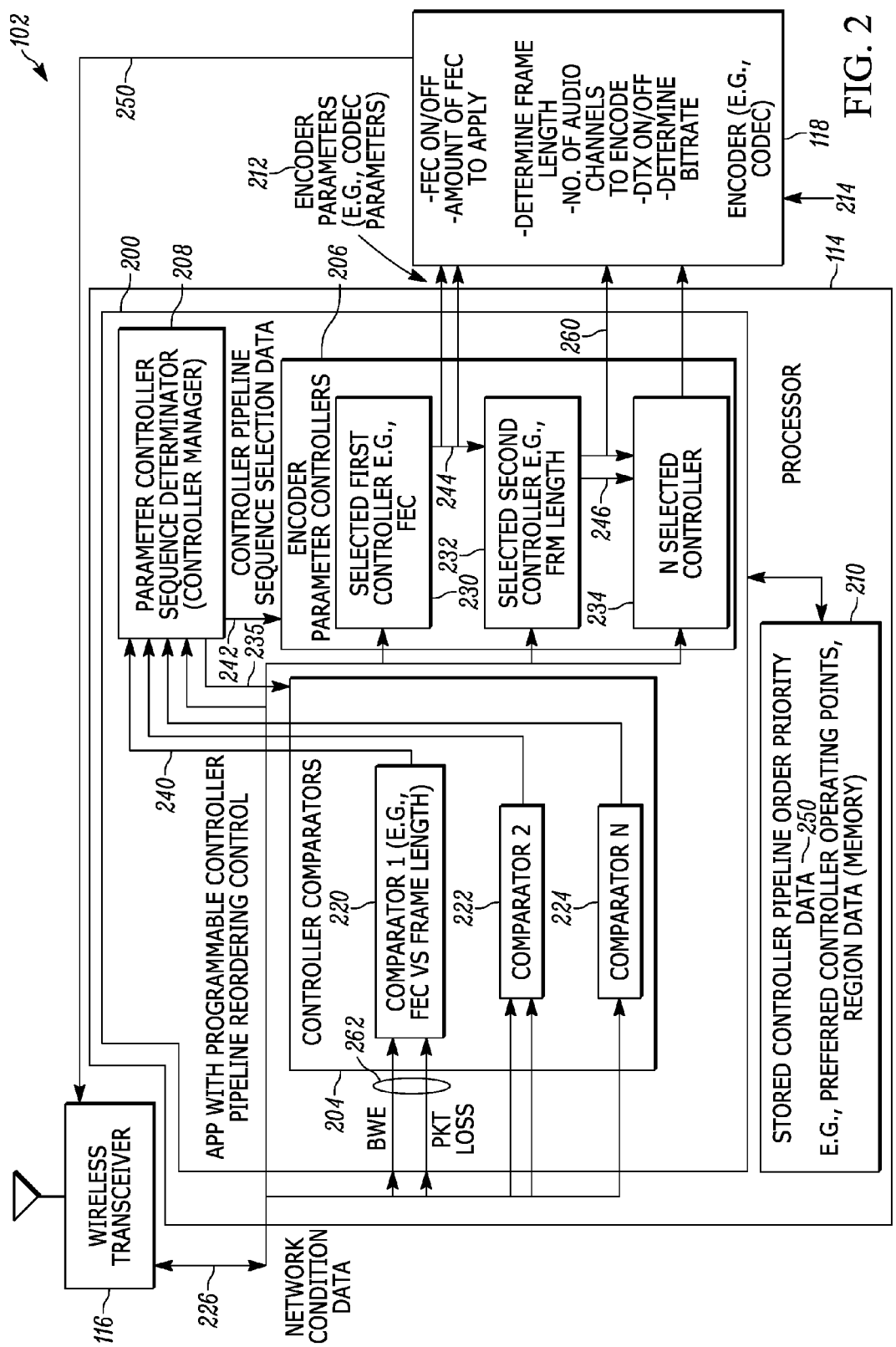
FIG. 2 is a block diagram illustrating one example of a communication device that is operative to perform data encoding as set forth below.

FIG. 2 illustrates in more detail an example of the processor 114 with encoder parameter controller pipeline reordering. In this example, processor 114 executes application 200 that has programmable controller pipeline reordering control. The application 200, in one example, is a video calling application or audio calling application. The operations described herein may also be applied to non-video and non-audio data, or may also be applied to other audio data that is communicated outside of a video or audio calling application. The processor 114 is configured to include controller comparators 204, encoder parameter controllers 206, and a parameter controller sequence determinator 208. The processor 114 may be configured with the various functional blocks by the processor loading executable code that may be stored in the non-transitory memory 122 in the form of executable instructions that when executed by the one or more processors 114 cause one or more processors to operate as the blocks 204, 206, 208. The parameter controllers 206 in one example are implemented in the processor as code modules that are called by the parameter controller sequence determinator 208 to execute in the determined pipeline order. In another embodiment, the blocks 204, 206, and 208 may be implemented as one or more state machines, field programmable data array, digital signal processor, or any other suitable structure.

The encoder parameter controllers 206 provide encoder parameters 212 to control encoder 118 to suitably encode data 214 which may be audio data, video data, or other suitable data as desired. In this example, the data 214 will be audio data that is provided through a microphone of the communication device 102 during an audio call. The encoder parameters 212 are changed during the audio call in an attempt to change the encoding in real time when network conditions change. In this example, there are a plurality of controller comparators 222 and 224, each designed to compare the priority of a combination of parameter controllers under given network condition data 226. Network condition data 226 as known in the art may be provided by a network element such as a base station, another device, or may be determined by the communication device 102 by sending test information across the communication link to determine the network condition data. Network condition data includes data representing bandwidth estimation, packet loss rate, round trip time for communicating a packet, and other suitable network condition data as known in the art.

Figures 3, 5:
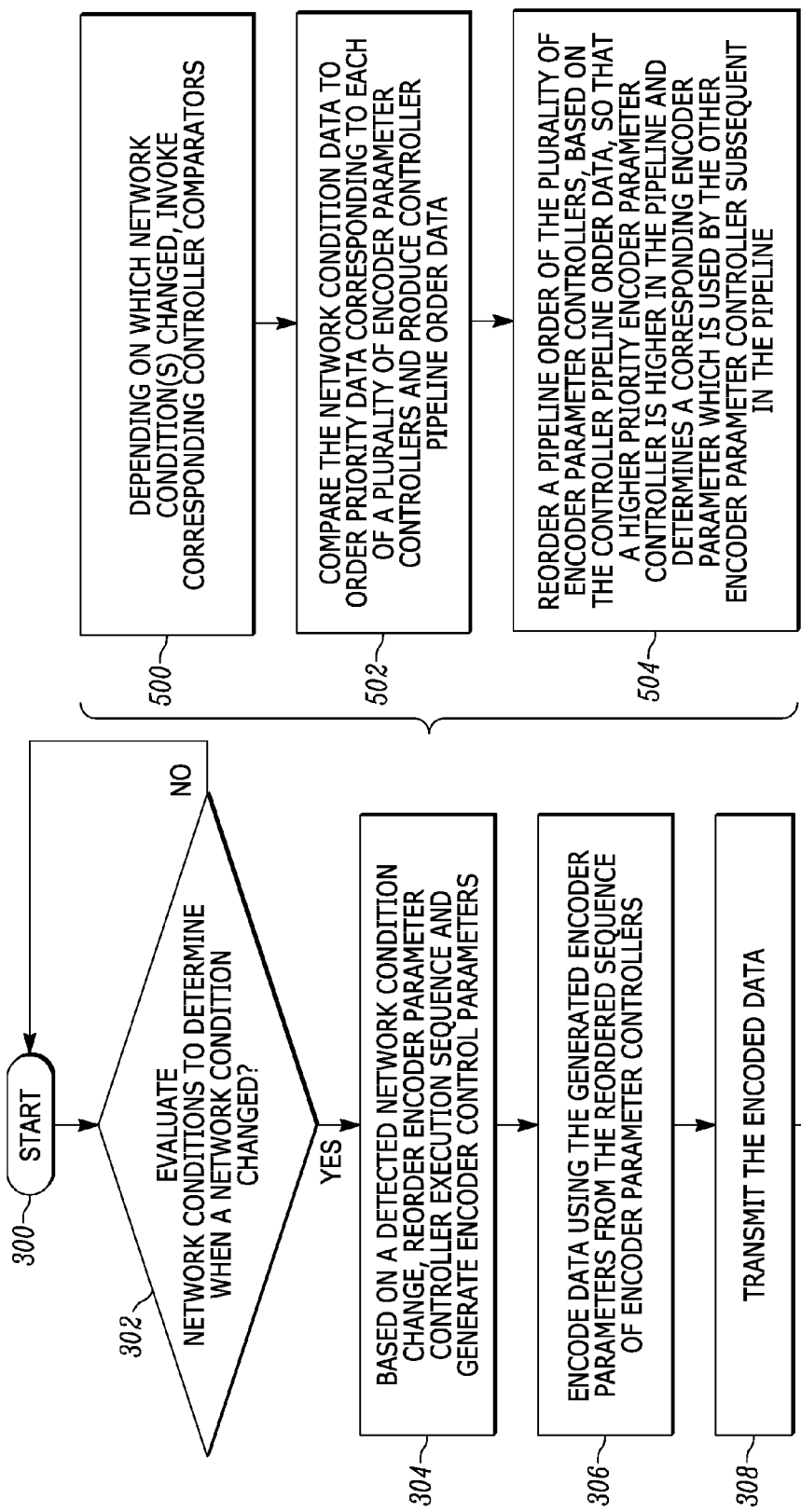
FIG. 3 illustrates a flow diagram for a method of operating an encoder in a communication device in accordance with one example set forth in the disclosure.
FIG. 5 illustrates a flow diagram for a method of operating an encoder in a communication device in accordance with one example set forth in the disclosure.

Referring also to FIG. 3, a method of operating an encoder 118 in the communication device 102 will be described. If desired the process to determine whether to reorder encoder parameter controllers may be configured to occur periodically (e.g., once per second or other suitable time) or may be triggered when a change in network condition has occurred. In one example, the device 102 evaluates network conditions, such as by the parameter controller sequence determinator 208 evaluating the network condition data 226, to determine when a network condition has changed beyond a desired threshold stored in memory 210. For example, the parameter controller sequence determinator 208 determines, for example, whether bandwidth estimation data indicates that the bandwidth of the communication channel is below a desired threshold. This may be carried out by analyzing the bandwidth estimation data over a period of time such as a second or other suitable period. Likewise, packet loss rate data received as network condition data or determined as network condition data 226 may also be checked against a desired threshold which may be stored in memory 210 or elsewhere.

As shown in block 304, when a detected network condition has changed beyond a desired threshold based on an analysis of the network condition data 226, the processor 114 through control logic 200 reorders encoder parameter controller execution sequence of the encoder parameter controllers 206. In this example selected parameter controllers 232 and 234 generate respective encoder control parameters 212. The determination on order of parameter controllers, in one example, includes multiple factors that can affect the result. For example, if bandwidth<threshold_1 AND packet loss<threshold_2 then a particular order of the pipeline is used.

For example, if the network condition data 226 indicates that the bandwidth estimation indicates a low bandwidth and the packet loss rate data indicates a high packet loss rate, the parameter controller sequence determinator 208 issues a control signal 235 such as a call to controller comparator 220 which determines whether an FEC parameter controller should execute before a frame length parameter controller or vice versa. Controller order data 240 indicates the order, in this example, between the FEC parameter controller and a frame length parameter controller. The parameter controller sequence determinator 208 then reorders the respective encoder parameter controllers in the order indicated by the comparator 220. In the example where the FEC parameter controller takes priority and is designated first in the order of the execution pipeline, it is determined to be the selected first controller 230 followed by the frame length parameter controller as the selected second controller 232 in the pipeline. The ordering of the differing encoder parameter controllers is controlled by controller pipeline sequence selection data 242 issued by the parameter controller sequence determinator 208. The controller pipeline sequence selection data 242 in one example are calls issued by the parameter controller sequence determinator 208 that calls the parameter controllers 206 in the determined reordered pipeline sequence. In this example, where there are only two encoder parameter controllers to be reordered, the controller pipeline sequence selection data 242 is effectively the same information as the controller order data 240 and causes the encoder parameter controller block 206 to execute the FEC parameter controller first followed by the frame length parameter controller second. The pipeline configuration of the encoder parameter controllers also causes the decisions of one encoder parameter controller to be used by a subsequent encoder parameter controller in the pipeline. This is shown, for example, by arrows 244 and 246.

The parameter controller sequence determinator 208 based on the controller order data 240 determines the reordering sequence of the encoder parameter controllers 206. Encoder parameter controllers may include, for example, an FEC parameter controller (A), a frame length parameter controller (B), a discontinuous transmission parameter controller(C), a bit rate parameter controller, an audio channel number parameter controller, or any other suitable encoder parameter controllers that produce parameters used by encoder 118 to control the encoder 118. If the parameter controller sequence determinator 208 receives controller order data 240 for more than one controller comparator 220, 222, or 224, the order of encoder parameter controllers can be determined by controller order data itself 240. For example, if controller order data 240 contains A>B from one controller comparator and B>C from another controller comparator, the final decision can be A>B>C. If the controller order data 240 is incomplete, such as there is a fourth parameter controller in the pipeline but no order data regarding D, the parameter controller D can be placed anywhere in the pipeline. The aggregation of controller order data 240 can be performed by (but not limited to) a suitable tree sort algorithm. Also the parameter controller sequence determinator 208 can decide the sequence in a way that tries to avoid FEC toggling by using the prior sequence.

Referring back to FIG. 3, as shown in block 306 once the encoder parameters 212 have been provided by the reordered encoder parameter controllers 206, the encoder 118 encodes data 214 using the generated encoder parameters 212 from the reordered sequence of encoder parameter controllers 206. As shown in block 308, the wireless transceiver 216 may then transmit the encoded data 250 to the recipient communication unit 104 or to any other suitable device. Alternatively, the encoded data 214 may be provided to another process within the device 102 or to any suitable location. The method then may continue to block 310 by continuously evaluating the network condition data 216 to determine when a network condition has changed to the point where the encoder needs to be provided with updated encoder parameters 212 through reordering of the encoder parameter controllers 206.

Control logic 200 in this example is implemented as a processor 114 executing executable code that may be in the form of a stored application or in any other suitable form. In this example, the control logic 200 determines when a network condition has changed by evaluating the network condition data 226 as described above. Based on the detected network condition change, the logic 200 reorders an encoder parameter controller execution sequence for the plurality of encoder parameter controllers such as an FEC parameter controller, frame length parameter controller, DTX parameter controller, bit rate parameter controller, and audio channel length parameter controller. The encoder control parameters 212 are produced from the reordered plurality of encoder parameter controllers 230 and 232. An encoder parameter determination from a prior parameter controller is used as a decision input for subsequent encoder parameter controllers as shown in information 244. One example represented in pseudo code is set forth below in Table 1:

TABLE 1

1. Read bandwidth_threshold_to_increase_frame_length from a look up table, the look up table may contain bandwidth thresholds for increasing frame length from A milliseconds to B milliseconds. An example is
   A | B   | bandwidth threshold (bps)
   20 | 60 | 72000
   60 | 120 | 18000
2. Read packet_loss_threshold_to_increase_frame_length from a look up table, an exemplar value of this threshold (also stored in memory 210) can be 4%.
3. if (bandwidth < bandwidth_threshold_to_increase_frame_length AND packet_loss < packet_loss_threshold_to_increase_frame_length AND FEC parameter controller has not decided to turn FEC on) {
use a larger frame length;
quit;}
4. Read bandwidth_threshold_to_decrease_frame_length from a look up table, the look up table may contain bandwidth thresholds for TABLE 1-continued decreasing frame length from A milliseconds to B milliseconds.
An example is
   A | B   | bandwidth threshold (bps)
   60 | 20 | 88000
   120 | 60 | 22000
5. Read packet_loss_threshold_to_decrease_frame_length, an exemplar value of this threshold can be 5%.
6. if (bandwidth > bandwidth_threshold_to_decrease_frame_length OR packet_loss > packet_loss_threshold_to_decrease_frame_length OR FEC parameter controller has decided to turn FEC on) {
use a smaller frame length;
quit.

The differing encoder parameter controllers 206, in one example are implemented as differing executable software modules that can be called in sequential manners to effect the sequential execution of each of the controllers. The encoder parameter determination from a prior encoder parameter controller 244 may be stored in a register or otherwise provided to a subsequent encoder parameter controller in the pipeline.

The memory 210 stores controller pipeline order priority data 250 corresponding to each of the encoder parameter controllers 206. The memory 210 also stores the lookup table of network condition data thresholds. In one example the order priority data 250 is stored on a per encoder parameter controller basis as a function of a selected combination of network condition data (see, for example, FIG. 4). The logic 200 evaluates wireless network condition data 226 that as noted above includes data representing wireless channel bandwidth use estimation, packet loss rate data in the wireless communication, and round trip time information of data communicated in the wireless communication and compares the information to stored thresholds. For example, the stored thresholds are generated empirically through testing of other devices in the communication network or the current device in the communication network to identify network condition data levels above or below which changes should be made to the encoder parameters 212 to provide the desired encoding levels.

Figure 4:
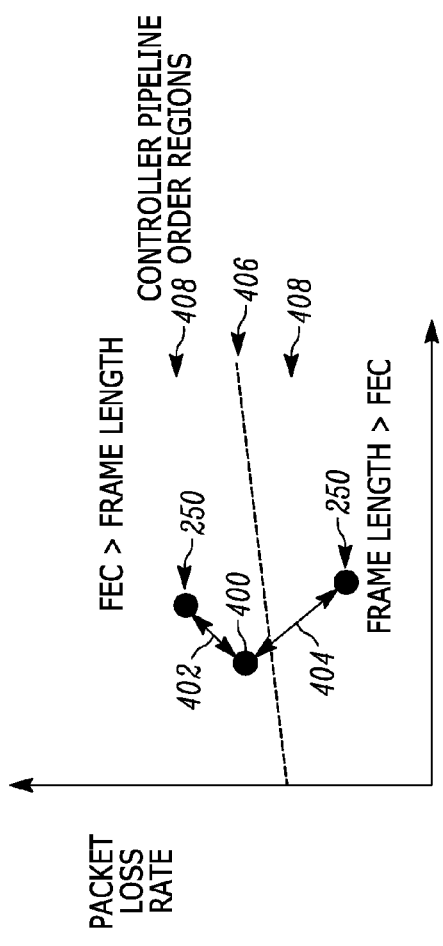
FIG. 4 a diagrammatic illustration of different examples of data employed by the communication device of FIG. 2 in accordance with one example set forth in the disclosure.

FIG. 4 diagrammatically illustrates the stored order priority data 250 in an example of the operation of controller comparator 220. In this example, the pipeline order priority data 250 is stored and is empirically determined through apriori network testing and indicates a preferred operational point where an FEC encoder parameter controller would operate as a function of the packet loss rate and bandwidth estimation level. A second point 250, also empirically determined, represents a desired operational point for an acceptable packet loss rate and bandwidth estimation level for the frame length encoder parameter controller. The ordering decision of the FEC parameter controller and that of the frame length controller are interdependent. For example, if FEC is ON, a long frame size should not be used. When the bandwidth of the network is high and packet rate is low, it is desirable to use long frame lengths, which means FEC should be OFF. To achieve this, at high bandwidth and low packet loss rate, the frame length parameter controller is ordered first. The frame length parameter controller can choose a long frame length freely. Such a decision is considered by the subsequent FEC parameter controller, and the decision of FEC parameter controller cannot prevent long frame length from happening.

Data 400 is the network condition data levels where at least one of the network conditions of either packet loss rate or bandwidth estimation, was determined to indicate a network change condition. The controller comparator 220, which is dedicated to handle the FEC versus frame length comparison, is used to compare the network condition data 400 to the order priority data 250 corresponding to each of the plurality of encoder parameter controllers (FEC parameter controller and frame length parameter controller) and produce controller pipeline order data 240. In one example, the controller comparator calculates a distance 402 and 404. The shortest distance, in this case, distance 402 is used to provide priority of the FEC encoder parameter controller over the frame length encoder parameter controller. The controller pipeline order data 240, therefore, indicates to the parameter controller sequence determinator 208 that the controller pipeline sequence selection data should cause the FEC encoder parameter controller to be at a higher order in the pipeline than the frame length encoder parameter controller as is illustrated in FIG. 2. As such, the reordering of the pipeline order of the plurality of encoder parameter controllers is based on the controller pipeline order data 240 so that a higher priority encoder parameter controller (in this case, FEC encoder parameter controller) is executed ahead of lower priority encoder parameter controllers in the pipeline.

The higher priority encoder parameter controller determines the corresponding encoder parameter 244, which is used by the other encoder parameter controller 232 subsequent in the pipeline. In this case the FEC encoder parameter controller produces encoder parameters 244, one indicating whether the FEC functioning should be on or off for the encoder 118, and another indicating the amount of FEC to apply by the encoder. The encoder parameters 244 are then used by the subsequent encoder parameter controller 232. In this example, the frame length encoder parameter controller 232 outputs an encoder parameter 260 which indicates a determined frame length for the encoder 118 to use. This information is provided to a subsequent controller, the subsequent controller of use. In addition, the subsequent controller 234 will also use the encoder parameters 244 from the first controller.

Referring again to FIG. 4, in another embodiment, the controller pipeline order data 250 may take the form of data representing a function 406 such as a line or curve which may be empirically determined so that if the network condition data 400 is above the line, then the FEC encoder parameter controller is given priority over the frame length encoder parameter controller as shown. The function data 406 may be, for example, data representing a line or a curve that may be stored in memory or may be implemented in any suitable manner. Accordingly, in this example, the memory stores controller pipeline order data representing controller pipeline order regions 408, which in this case are above and below boundary line 406 in a network condition space. In this example, the network condition space corresponds to packet loss rate and network bandwidth estimation. The network condition data 400 provides a point within one of the regions 408 and an order in a pipeline encoder parameter controller selected by, in this example, comparator 220 depending upon where the network condition data 400 point lies within the regions 408 of the network condition space.

Referring also to FIG. 5, which illustrates in more detail an example of a method carrying out the operation of block 304 of FIG. 3. The method includes, depending upon which network condition changed as shown in block 500, invoking a corresponding controller comparator 220, 222, or 224. For example, comparator 220 is configured to compare bandwidth estimation data and packet loss rate data. If the network condition data indicates that one or more of these network conditions has changed beyond a desired threshold, the comparator 220 is invoked to run a comparison to determine the order between a FEC parameter controller and a frame length parameter controller. Controller comparator 222 may be designated for a differing combination of network condition data, the controller comparator 222 may use "round trip time" data as input, if round trip time is above a threshold, it lets the DTX parameter controller dominate the "frame length parameter controller" and vice versa.

As shown in block 500, the method includes depending upon which network condition or conditions changed, invoking a corresponding controller comparator. This may be done by control logic 200 invoking one of the controller comparators 204. In this example, comparator 220 is invoked assuming, for example, that the packet loss rate has increased beyond the desired threshold. As shown in block 502, the controller comparator 220 compares the network condition data 400 to order priority data 250 corresponding to each of the plurality of encoder parameter controllers. In this example, the encoder parameter controllers are the FEC parameter controller and the frame length parameter controller. The method includes producing controller pipeline order data 240 indicating the order in which the respective controllers are to be arranged in a pipeline to produce encoder parameters 212. As shown in block 504, the method includes reordering a pipeline order of the plurality of encoder parameter controllers. For example, a prior pipeline configuration may have had the frame length parameter controller execute before the FEC parameter controller. Since the network conditions have changed, the pipeline is reordered based on the controller pipeline order data 240 so that a higher priority encoder parameter controller (e.g., FEC parameter controller) is higher in the pipeline. The higher priority encoder parameter controller determines a corresponding encoder parameter 244 which is used by the other encoder parameter controller 232 subsequent in the pipeline.

Figure 6:
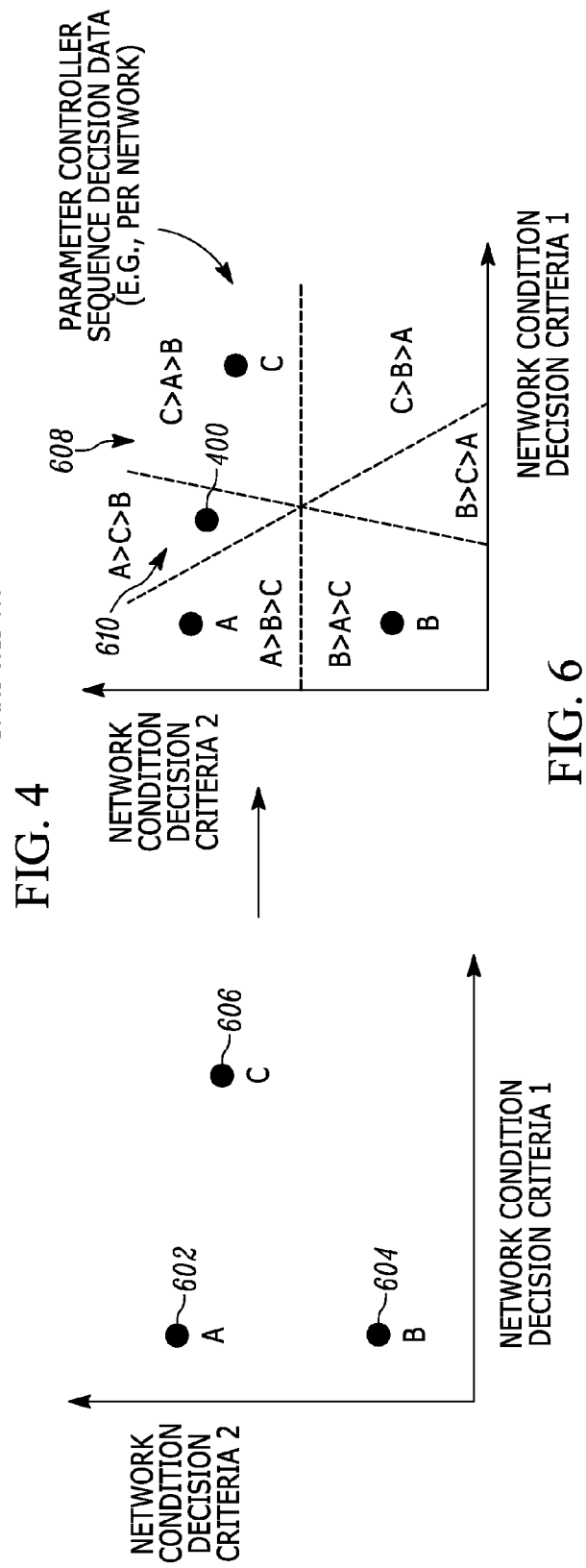
FIG. 6 is a diagrammatic illustration showing the definition of controller pipeline order regions for three encoder parameter controllers in accordance with one example set forth in the disclosure.

FIG. 6 diagrammatically illustrates employing a third order priority point corresponding to a third encoder parameter controller such as, for example, a bit rate parameter controller or other encoder parameter controller. The order priority data 602, 604, and 606 for three different encoder parameter controllers are determined empirically as noted above with respect to FIG. 4. A plurality of controller pipeline order regions (six in this example) illustrated as 608 are defined in stored memory 210. The parameter controller order sequence is also stored for each region. In this example, region 610 shows that an encoder parameter controller A is first in the pipeline, followed by encoder parameter controller C, follow by encoder parameter controller B (A is greater than C is greater than B). As such, if the network condition data 400 falls within controller pipeline order region 610, the reordering of encoder parameter controllers will be performed according to the defined order within the region. Using order priority data 602, 604, 606 and distance to them may be simpler and less expensive than using regions since, in one case, three points are used and in the other, there needs to be a decision as to how to place six regions. However, either approach is suitable.

Figure 7:
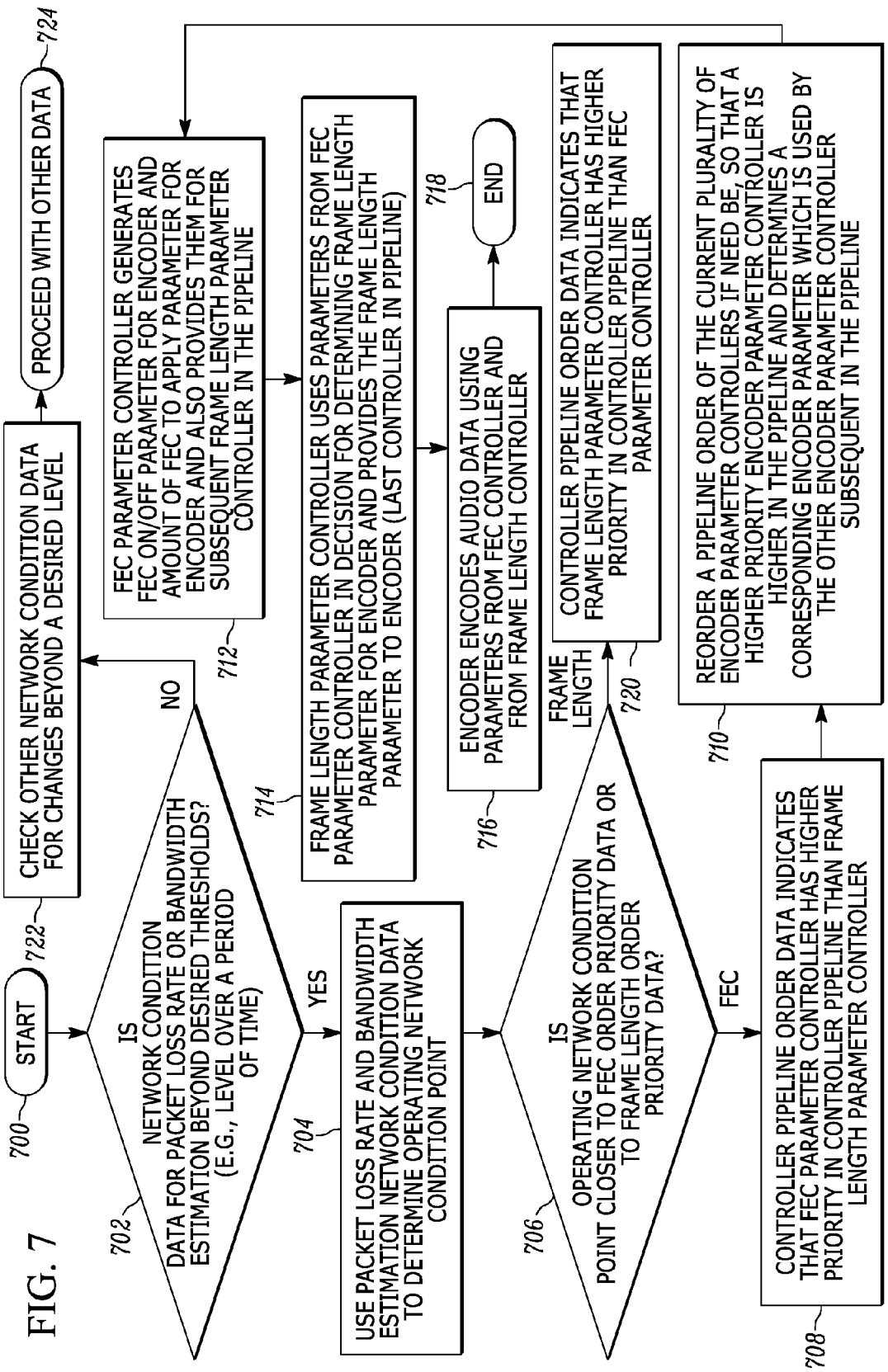
FIG. 7 illustrates one example of a method of operating an encoder and communication device in accordance with one example set forth in the disclosure.

FIG. 7 illustrates a method of operating an encoder in a communication device using the example of determining the order in an encoder parameter controller pipeline between an FEC parameter controller and a frame length parameter controller. As shown in block 700, the method may start by obtaining network condition data during a VoIP call. As shown in block 702, the method includes determining that the network condition data for a packet loss rate or bandwidth estimation is beyond a desired threshold. As noted above this may be carried out, for example, by the logic 200. If one or more of these networks conditions is beyond a desired threshold, the method proceeds as shown in block 704 wherein the packet loss rate and bandwidth estimation network condition data 262 is used by the comparator to determine an operating network condition point 400.

As shown in block 706, the method includes determining if the operating network condition 400 is closer to an FEC order priority data 250 or to frame length priority data 250. If the operating network condition point 400 is closer to the FEC order priority data 250, the method proceeds to block 708 where controller pipeline order data 240 indicates that the FEC parameter controller has higher priority in the parameter controller than the frame length parameter controller. The parameter controller sequence determinator uses the pipeline order data to control execution of a respective parameter controller to operate in the pipeline sequence designated by the pipeline order data 240. As such, the parameter controller sequence determinator 208 issues controller pipeline sequence selection data 242 to select the sequence of operation of the respective encoder parameter controllers so that a higher encoder parameter controller is higher in the pipeline. A corresponding encoder parameter produced by the higher priority encoders is then used by the other encoder parameter controller subsequent in the pipeline.

As shown in block 712, the FEC parameter controller generates an FEC on or off parameter for the encoder 118 to indicate whether FEC should be applied or not. Another parameter provided by the FEC parameter controller is the amount of FEC to apply, as known in the art, which is also provided to the encoder as shown in data 244. The selected first controller, namely the FEC parameter controller in this example, also provides the parameters 244 for subsequent frame length parameter controller 232 in the pipeline. As shown in block 714, the frame length parameter controller then uses the parameters 244 from the FEC parameter controller in its decision for determining the frame length parameter 260 as noted above. The frame length parameter controller provides a determined frame length as the encoder parameter 260. In this example, the frame length parameter controller is the last controller in the pipeline, and as such the encoder 118 produces the encoded data 250 using the encoded parameters 212 from the reordered encoder parameter controllers.

Referring back to block 706, if the frame length parameter controller received priority in the pipeline then the controller pipeline sequence selection data selects the frame length parameter controller as the first controller in the pipeline, followed by the FEC parameter controller. The frame length parameter controller then produces the determined frame length, which is then passed to the FEC parameter controller for its decision.

Referring back to block 702, if no network condition change is detected the method continues as shown in block 722 to check for other network condition data changes for data beyond a desired threshold. If other network condition data is beyond a desired threshold then the method includes invoking another comparator, such as comparator 222 or 224, depending upon which network condition data has changed.

Among other advantages, the above technique is codec independent and can help provide optimization of audio quality for VoIP calls or any other suitable data. The above techniques using one or more embodiments can enable audio calling when video calling is not possible due to bad network behavior, for example. Parameter controller re-ordering can also facilitate a flexible and real time (e.g., codec parameter changes can happen in tens of milliseconds after network condition changes occur) rapid response to changing network conditions.

The above detailed description and the examples described therein have been presented for the purposes of illustration and description only and not for limitation. For example, the operations described may be done in any suitable manner. The methods may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic circuitry or any other suitable structure capable of producing the same effect are also contemplated.

What is claimed is:

1. A method of operating an encoder in a communication device comprising:
    determining, by control logic, when a network condition has changed by evaluating network condition data;
    based on a detected network condition change, reordering an encoder parameter controller execution sequence for a plurality of encoder parameter controllers in the communication device from a prior order;
    generating encoder control parameters from the reordered plurality of encoder parameter controllers wherein an encoder parameter determination from a prior encoder parameter controller is used as a decision input for a subsequent encoder parameter controller; and
    encoding data, by the encoder, using the generated encoder control parameters from the reordered plurality of encoder parameter controllers.

2. The method of claim 1 wherein reordering the encoder parameter controller execution sequence for the plurality of encoder parameter controllers comprises:
    comparing the network condition data to order priority data corresponding to each of a plurality of encoder parameter controllers and producing controller pipeline order data; and
    wherein reordering comprises reordering a pipeline order of the plurality of encoder parameter controllers, based on the controller pipeline order data, so that a higher priority encoder parameter controller is higher in the pipeline and determines a corresponding encoder parameter which is used by the other encoder parameter controller subsequent in the pipeline.

3. The method of claim 2 comprising generating controller pipeline sequence selection data that causes the reordering of the encoder parameter controller execution sequence for the plurality of encoder parameter controllers in response to the controller pipeline order data.

4. The method of claim 3 wherein the encoder comprises an audio codec, wherein the determining when a network condition has changed comprises determining when a plurality of wireless network conditions have changed during a voice call such that reordering of the plurality of encoder parameter controllers occurs more than once during the same voice call and wherein the method comprises transmitting the encoded data to a recipient unit.

5. The method of claim 2 wherein generating encoder control parameters from the reordered plurality of encoder parameter controllers comprises generating, by a higher priority forward error correction parameter controller, encoder parameter data representing whether forward error correction should be on or off and an amount of forward error correction for the encoder to apply; and wherein a lower priority frame length encoder parameter controller in the order pipeline uses the encoder parameter data from the higher priority forward error correction parameter controller in a decision to determine encoder parameter data relating to frame length of data provided by the encoder.

6. The method of claim 1 wherein reordering the encoder parameter controller execution sequence for the plurality of encoder parameter controllers comprises storing controller pipeline order data representing controller pipeline order regions in a network condition data space corresponding to at least packet loss rate and network bandwidth estimation and wherein the network condition data provides a point within one of the regions and wherein an order in a pipeline for an encoder parameter controller is selected depending on where the network condition data point lies within in the regions of the network condition space.

7. The method of claim 3 wherein determining, by control logic, when the wireless network condition has changed comprises evaluating wireless network condition data that is comprised of at least one of data representing:
  wireless channel bandwidth use estimation;
  packet loss level of data in the wireless communication; and
  round trip time information of data communicated in the wireless communication; and
wherein the controller pipeline orders regions are defined by data representing an empirically determined preferred encoder parameter controller operational boundary between the plurality of encoder parameter controllers.

8. A communication device comprising:
  an encoder;
  a plurality of encoder parameter controllers in the communication device operatively coupled to the encoder; and
  control logic, operatively coupled to the plurality of encoder parameter controllers, and operative to determine when a network condition has changed by evaluating network condition data and based on a detected network condition change, reorder an encoder parameter controller execution sequence of the plurality of encoder parameter controllers from a prior order and configure the plurality of reordered encoder parameter controllers so that an encoder parameter determination from a prior encoder parameter controller is used as a decision input for a subsequent encoder parameter controller; and
  wherein the encoder is operative to encode data using the generated encoder control parameters from the reordered plurality of encoder parameter controllers.

9. The device of claim 8 wherein the control logic comprises at least one controller comparator operative to compare the network condition data to stored order priority data corresponding to each of the plurality of encoder parameter controllers and produce controller pipeline order data; and
  wherein the control logic comprises parameter controller sequence determinator logic operatively coupled to the at least one controller comparator and operative to reorder a pipeline order of the plurality of encoder parameter controllers, based on the controller pipeline order data, so that a higher priority encoder parameter controller is higher in the pipeline and determines a corresponding encoder parameter which is used by the other encoder parameter controller subsequent in the pipeline.

10. The device of claim 9 wherein the parameter controller sequence determinator logic is operative to generate controller pipeline sequence selection data that causes the reordering of the encoder parameter controller execution sequence for the plurality of encoder parameter controllers in response to the controller pipeline order data.

11. The device of claim 10 wherein the encoder is an audio codec, wherein the control logic is operative to determine when a plurality of wireless network conditions have changed during a voice call with a recipient unit such that reordering of the plurality of encoder parameter controllers occurs more than once during the same voice call and wherein the device comprises a transmitter that is operative to transmit the encoded data to the recipient unit during the voice call.

12. The device of claim 9 wherein generating encoder control parameters from the reordered plurality of encoder parameter controllers comprises generating, by a higher priority forward error correction parameter controller, encoder parameter data representing whether forward error correction should be on or off and an amount of forward error correction for the encoder to apply; and wherein a lower priority frame length encoder parameter controller in the pipeline uses the encoder parameter data from the higher priority forward error correction parameter controller in a decision to determine encoder parameter data relating to frame length of data provided by the encoder.

13. The device of claim 8 wherein the control logic comprises at least one controller comparator operative to store data representing controller pipeline order regions in a network condition data space corresponding to at least packet loss rate and network bandwidth estimation and wherein the network condition data provides a point within one of the regions and wherein the controller comparator selects an order for an encoder parameter controller depending on where the network condition data point lies within the regions of the network condition space.

14. The device of claim 13 wherein the control logic evaluates wireless network condition data that is comprised of at least one of data representing:
  wireless channel bandwidth use estimation;
  packet loss level of data in the wireless communication; and
  round trip time information of data communicated in the wireless communication; and
wherein the at least one controller comparator stores data representing controller pipeline order regions defined by data representing an empirically determined preferred encoder parameter controller operational boundary between the plurality of encoder parameter controllers.

15. A communication device comprising:
  an audio codec;
  a wireless transmitter, operatively coupled to the audio codec;
  one or more processors, operatively coupled to the audio codec and configured as plurality of codec parameter controllers, and also configured to determine when a wireless network condition has changed by evaluating wireless network condition data, and based on a detected wireless network condition change, reorder a codec parameter controller execution sequence of the plurality of codec parameter controllers from a prior order and configure the plurality of reordered codec parameter controllers so that a codec parameter determination from a prior codec parameter controller is used as a decision input for a subsequent codec parameter controller; and wherein the codec is operative to encode audio data using the generated codec control parameters from the reordered plurality of codec parameter controllers; and wherein the wireless transmitter is operative to transmit the encoded audio data to a recipient unit.

16. The device of claim 15 wherein the one or more processors is configured as controller comparator operative to compare the wireless network condition data to stored order priority data corresponding to each of the plurality of codec parameter controllers and produce controller pipeline order data; and wherein the one or more processors is configured to have parameter controller sequence determinator logic operative to reorder a pipeline order of the plurality of codec parameter controllers, based on the controller pipeline order data, so that a higher priority codec parameter controller is higher in the pipeline and determines a corresponding codec parameter which is used by the other codec parameter controller subsequent in the pipeline.

17. The device of claim 16 wherein the parameter controller sequence determinator logic is operative to generate controller pipeline sequence selection data that causes the reordering of the codec parameter controller execution sequence for the plurality of codec parameter controllers in response to the controller pipeline order data.

18. The device of claim 17 wherein the one or more processors is operative to determine when a plurality of wireless network conditions have changed during a voice call such that reordering of the plurality of codec parameter controllers occurs more than once during the same voice call.

19. The device of claim 15 comprising memory that stores data representing controller pipeline order regions in a network condition data space corresponding to at least packet loss rate and network bandwidth estimation and wherein the network condition data provides a point within one of the regions and wherein the one or more processors is configured to include at least one controller comparator operative to select a pipeline order for a codec parameter controller depending on where the network condition data point lies within the regions of the network condition space.

20. The device of claim 19 wherein the one or more processors evaluates wireless network condition data that is comprised of at least one of data representing:

wireless channel bandwidth use estimation;

packet loss level of data in the wireless communication; and round trip time information of data communicated in the wireless communication; and wherein the memory stores data representing controller pipeline order regions defined by data representing an empirically determined preferred codec parameter controller operational boundary between the plurality of codec parameter controllers and wherein the controller comparator determines a pipeline order of the codec parameter controllers based on the wireless network condition data and based on the data representing an empirically determined preferred codec parameter controller operational boundary between the plurality of codec parameter controllers.

* * * * *